Patented June 6, 1939

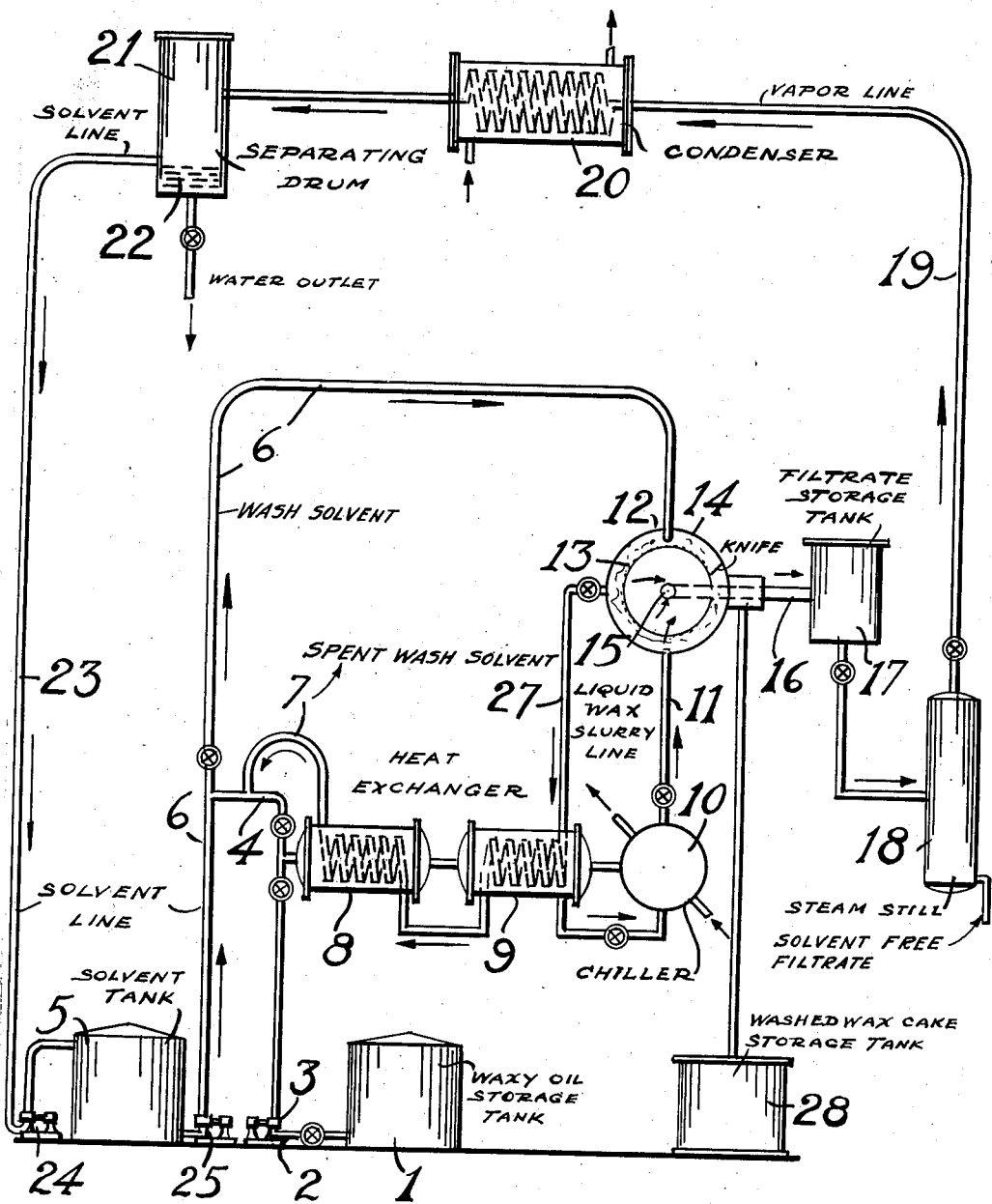

2,160,985

UNITED STATES PATENT OFFICE 2,160,985

SOLVENT DEWAXING PROCESS

Oldrich S. Pokorny, Sarnia, Ontario, Canada, assignor to Standard Oil Development Company, a corporation of Delaware Application February 3, 1937, Serial No. 123,760

10 Claims. (Cl. 196—18)

This invention relates to the removal of waxy constituents from lubricating oils and is more particularly concerned with new solvents and solvent mixtures suitable for the purpose.

The invention will be fully understood from the following description read with reference to the accompanying drawing which is a semi-diagrammatic view in sectional elevation of a dewaxing apparatus and illustrates the flow of materials.

The ideal solvent for dewaxing is one which has substantially no solubility for wax at dewaxing temperatures, has a very low miscibility temperature with the oil, makes possible high filtering rates at low temperatures, and is easily separable and recoverable from the dewaxed oil. Few, if any, solvents possess all of these characteristics. Some solvents have certain of the characteristics but lack certain others. As a practical matter the solvent or solvent mixtures which possess the greatest number of these characteristics are natural preferred.

A new group of dewaxing solvents has now been discovered which have three of the four highly desirable characteristics. These solvents are aliphatic ketones containing a normal propyl group and a total of 5 or 6 carbon atoms in a molecule. Typical and preferred examples of this group of solvents are methyl n-propyl ketone $(CH_3COCH_2CH_2CH_3)$, ethyl n-propyl ketone $(C_2H_5COCH_2CH_2CH_3)$. These solvents are characterized by extremely low wax solubility at dewaxing temperatures, by low miscibility temperatures with oil, and by extremely high filter rates in solution with oil at low temperatures.

The dewaxing of oils with these ketones is carried out as follows:

Referring to the drawing, numeral 1 designates a storage tank for waxy oil, which tank is maintained at a temperature above solidification point of the wax. The oil is removed by a line 2 and a pump 3. Solvent is added to this oil by means of a pipe 4 from a solvent tank 5 through a line 6. This is used to put the process in operation, but after the conditions have been settled to a steady state, fresh solvent is not added directly to the oil but is supplied for washing filter cake as will be disclosed below, and the washings from the filter are added to the oil to be dewaxed through pipe 4, as indicated before.

The oil-solvent mixture is then blended in the desired proportion disclosed below, passes to heat exchangers 8 and 9, then through a chiller 10. In the chiller the temperature is reduced to such a point that the waxy content of the mixture is solidified. Pipe 11 conducts this mixture of liquid constituents and solid particles of wax to a filter shown generally at 12. The filter may, of course, be an ordinary plate and frame type, but it is preferred to use a continuous type of filter. This consists of a drum 13, the cylindrical surface of which is covered with the filter cloth. The drum is mounted in a casing 14 on an axle, of which only the end 15 is shown. The operation of a continuous filter is well known, and it need only be said that the drum is continually rotated at a low speed. The liquid wax slurry is introduced at the bottom of the casing and filtration occurs on about 30–40% of the circumference. The filtrate passes through the cloth and finds its way out through one end of the axle 15, which is of course in the form of a pipe. A pipe 16 connected to the end of the axle conducts the filtrate to a storage tank 17. From the storage tank the filtrate is passed to a steam still 18 from which the solvent together with steam passes overhead through vapor line 19 to a condenser 20. The solvent separates from the condensed steam in a separator drum 21. Water is discarded by pipe 22 and solvent passes by pipe 23 and a pump 24 to the tank 5 for re-use.

As indicated above, about 35–40% of the circumference of the drum is continually in use for filtration, being directly submerged in the wax-solution mixture. During this period wax cake is formed which can be described as having a spongy structure, due to the interlocking of wax crystal, in which the volume of "voids" filled with the solution is about ten times as great as is the volume of the crystalline paraffine wax which is deposited on the filter blanket. This wax cake continuously moves into the sector (about 50–55% of the circumference) in which it is continuously washed with fresh solvent. The precooled solvent which is used as a washing liquor is drawn directly from tank 5 by a pump 25 and enters the filter casing at the top.

It has been discovered that in the washing cycle about 25–35% of the solution retained in the voids of the wax cake can be displaced by the wash solvent without changing the concentration of the oil in the filtrate. The filtrate from the washing cycle is therefore split into two fractions. The first fraction, amounting to between 25–35% of the total solution in the wax cake, can easily be displaced, and being identical in composition to the main bulk of the filtrate obtained during the submergence or filtration cycle, would be cut to the filtrate tank. The second fraction, with a lower concentration of oil than is the main bulk of the filtrate, is used for diluting the incoming waxy charge. It will be understood that there is no admixture of the filtrate and of the washing liquor since the axle of the filtering drum is fitted with a suitable partition, not shown in the drawing, dividing it into two passageways. In the drawing this division is indicated by the filtrate passing out of the axle at one end, while the washing liquor is removed from the opposite end.

The washing liquor flows through a pipe 27 to the heat exchangers 9 and 8, and then passes through a pipe 7 and is mixed with the original waxy feed through the pipe 4. As stated before, fresh solvent is not used for diluting the waxy stock but is supplied for washing the wax cake only. The total filtering cycle, i. e. time required for filtration, washing, drying and "blowing" or removing the wax cake, is not materially lengthened by using a relatively large quantity of solvent for washing the wax cake, as the filtering rate of the fresh solvent towards the end of the wash cycle becomes very high. By applying all the fresh solvent as wash solvent it is possible, however, to produce a substantially oil-free wax, while the yield of dewaxed oil is close to the theoretical yield. That is, with an over-all dilution of 2.0 parts of solvent to 1.0 part of waxy stock, it is possible to obtain a greater yield of dewaxed oil than is possible by the standard procedure described in the literature, in which about twice this volume of solvent is used.

The washed wax cake is carried over into a removal zone, ("blowing"), in which the cake is scraped from the filter blanket by means of a suitable doctor knife. It is collected at 28.

The wax cake scraped from the filter contains about 6 parts by volume of solvent per unit volume of paraffine wax. While the solvent to wax ratio can be somewhat reduced by a more prolonged drying on the filter, this would result in a lower throughput. If desirable a larger reduction can be effected by conveying the scraped wax cake to centrifuges or a continuous roll-press somewhat similar in design to those used in the paper industry, but provided with chilled metal rollers. The solution thus squeezed out is recycled back as dilution, while the pressed wax cake is collected and sent to the solvent recovery plant.

It will be understood that the dewaxing operation, i. e. the mechanical separation of the wax from solution, may be accomplished by other means than by filtration. While filtration is perhaps the most advantageous mechanical means to separate the precipitated wax from the solution, centrifuges may also be employed. It is also possible to use settling tanks in which the mixture is allowed to stand until the waxy constituents have settled to the bottom. This method is, however, inefficient and much less desirable than the other two previously mentioned.

In the operation of the process, the solvents used are, as indicated above, aliphatic ketones containing a propyl group and having from 5–6 carbon atoms per molecule. The preferred solvent is methyl-normal-propyl ketone although ethyl n-propyl ketone may also be used. Methyl n-propyl ketone has a relatively very low miscibility temperature with oil. For example, in diluting 1.0 part of a phenol treated Mid-Continent distillate having a viscosity of 125 seconds Saybolt at 210° F. with 2.0 parts of solvent, a miscibility temperature of $+11°$ F. was found. The solubility of wax in methyl n-propyl ketone is also extremely low. For example, at 0° F. the solubility of a 141–143° F. M. P. wax is only .0005 gram/100 cc. At $-10°$ F. the solubility is only .0002 gram/100 cc. In addition to these two advantages, it has been found that the rate of filtration of oils when diluted with methyl n-propyl ketone is unusually rapid. It will be understood that a rapid filtration rate is of great importance from a commercial and economic standpoint because the more rapid the filter rate the greater the capacity of a given equipment.

Frequently it is advantageous, particularly when dewaxing cylinder stocks and residual oils, to use a mixture of methyl n-propyl ketone and methyl n-butyl ketone ($CH_3COCH_2CH_2CH_2CH_3$). The latter of the two has a substantially lower miscibility temperature with oil, for example, with the oil referred to above the miscibility temperature for methyl n-butyl ketone is $-38°$ F. whereas it is $+11°$ F. for methyl n-propyl ketone. It will be understood that other solvents such as benzol, naphthas, o-dichlorbenzene, etc. may also be used to lower the miscibility temperature of the solvent with the oil and thereby to prevent the separation of oil at low temperatures. It is preferred, however, to use methyl n-butyl ketone and other higher aliphatic ketones for this purpose. Mixtures of 50% methyl n-propyl ketone and 50% methyl n-butyl ketone are particularly suitable.

The quantity of solvent used per volume of waxy oil will vary considerably depending upon the viscosity of the oil, the wax content, and the desirability of preparing commercial grades of wax from the wax cake formed on the filters. In general it is possible to use less solvent with the lighter distillates than with the heavier oils. The total amount of solvent used, including that for washing, may be as low as one volume of solvent per volume of waxy oil. With heavier oils, or if it is desirable to produce wax substantially free of oil, it is preferable to use from 1½ to 2 volumes of solvent per volume of oil. It is rare that more than 2½ volumes of solvent are required, although even larger amounts than this may be advantageous when the wax content of the oil exceeds 15 to 20%, chiefly to increase the fluidity of the wax slurry charged to the continuous filters.

The filtration rate in continuous rotary filters with these solvents will also vary with the viscosity of the oil, but even in the case of very viscous residual oils and cylinder stocks it is possible to obtain filter rates in excess of 3.5 gallons of waxy oil per square foot of filter area. The separation between oil and wax is remarkably sharp, and while in most cases the pour point of the filtrate is the same as the dewaxing temperature, it is found that it is even possible to obtain pour points from 10 to 15° F. below the dewaxing temperature.

The following examples illustrate the use of these solvents in dewaxing:

Example I

One part of a light paraffine distillate is diluted with 0.75 part of methyl n-propyl ketone. The mixture is chilled to a dewaxing temperature of $+27°$ F. and is then filtered in a continuous rotary filter. The time required to form a $\tfrac{5}{16}$ inch wax cake is 1¼ minutes and the solution throughput in gallons/square foot of filtering surface is 0.325 per minute. The wash solvent ratio is 1.46 parts of solvent to 1 part of waxy stock charged. The throughput of dewaxed oil in gallons per square foot per hour is 5.0. The yield of dewaxed oil obtained is 91% and the pour point is $+30°$ F.

Example II

A raw intermediate distillate is diluted with 1.5 volumes of methyl n-propyl ketone and chilled to a dewaxing temperature of +15° F. It is then filtered in a continuous rotary filter. The time to form a 5/16 inch wax cake is ½ minute. The solution throughput is 0.606 gallon/square foot/minute. The wash solvent ratio is 1.10 parts solvent to 1.0 part of waxy stock charged. The dewaxed oil throughput is 11.7 gallons/square foot/hour. The yield of dewaxed oil is 92% and the pour point is +10° F.

*Example III*

A raw cylinder stock is diluted with 2.0 volumes of methyl n-propyl ketone and chilled to +26° F. It is then filtered as in Examples I and II. The time to form a 5/16 inch wax cake is ¾ minute. The solution throughput is 0.352 gallons/square foot/minute. The wash solvent ratio is 1.0 part to 1 part of waxy stock charged. The dewaxed oil throughput is 4.3 gallons/square foot/hour. The yield of dewaxed oil is 92% and the pour point is +20° F.

*Example IV*

Another portion of the same raw cylinder stock as used in Example III is diluted with 2.5 volumes of methyl n-propyl ketone and chilled to +28° F. and then filtered. The time to form a 5/16 inch wax cake is ¾ minute. The solution throughput is 0.579 gallon per square foot per minute. The wash solvent ratio is 0.45 part solvent to 1.0 part of waxy stock charged. The dewaxed oil throughput is 5.8 gallons/square foot/hour. The yield of dewaxed oil is 93% and the pour point is +25° F.

*Example V*

A phenol treated intermediate distillate is diluted with 2 volumes of a mixed solvent consisting of 50% methyl n-propyl ketone and 50% methyl n-butyl ketone, the mixture is chilled to +15° F. and then filtered in a continuous rotary filter. The time required to form a 5/16 inch wax cake is ½ minute. The solution throughput is 0.261 gallon/square foot/minute. The wash solvent ratio was 1.0 part of solvent mix to 1.0 part of waxy stock charged. The dewaxed oil throughput was 3.5 gallons/square foot/hour. The yield of dewaxed oil is 75% and the pour point is +20° F.

*Example VI*

A high viscosity index raffinate obtained from the phenol extraction of a lubricating oil derived from Rodessa crude is diluted with 3.0 volumes of the mixed solvent used in Example V, the mixture is chilled to +5° F. and filtered. The time to form a 5/16 inch wax cake is 10 seconds. The solution throughput is 0.512 gallon/square foot/minute. The wash solvent ratio is 3.17 parts solvent mix to 1.0 part waxy stock charged. The dewaxed oil throughput is 4.9 gallons/square foot/hour. The yield of dewaxed oil is 78% and the pour point is +10° F.

*Example VII*

A residual lubricating fraction of Rodessa crude which has been subjected to extraction with propane-phenol solvent is diluted with 3.0 volumes of the mixed ketone solvent used in Examples V and VI; the mixture is chilled to +15° F. and then filtered. The time required to form a 5/16 inch wax cake is ¾ minute. The solution throughput is 0.689 gallon/square foot/minute. The wash solvent ratio is 2.82 parts solvent to 1.0 part waxy stock charged. The dewaxed oil throughput is 4.3 gallons/square foot/hour. The yield of dewaxed oil is 80% and the pour point is +15° F.

It will be observed from the above examples that the filter rate of dewaxed oil/square foot/hour is substantially higher in the case of methyl n-propyl ketone than in the case of the 50% mixture of methyl n-propyl ketone with methyl n-butyl ketone.

This invention is not limited by any theories of the mechanism of dewaxing nor by any details which have been given merely for purposes of illustration, but is limited only in and by the following claims in which it is intended to claim all novelty inherent in the invention.

I claim:

1. Process of dewaxing mineral oil which comprises diluting the oil with a solvent consisting essentially of an aliphatic normal ketone selected from the class having 5 and 6 carbon atoms in the molecule and containing an aliphatic group of at least three carbon atoms, chilling the mixture to a temperature at which wax is caused to precipitate, removing the wax, and recovering dewaxed oil from the filtrate.

2. Process according to claim 1 in which the aliphatic ketone is a normal propyl ketone.

3. Process of separating waxy and oily petroleum fractions which comprises diluting a mixture of waxy and oily constituents with a solvent consisting essentially of an aliphatic normal ketone containing a propyl radical and selected from the class having 5 and 6 carbon atoms in the molecule, chilling the diluted oil to a wax separation temperature, removing the wax and recovering dewaxed oil.

4. Process of dewaxing petroleum oil which comprises diluting the oil with methyl normal propyl ketone, chilling the diluted oil to a wax separation temperature, removing the wax by filtration and recovering dewaxed oil.

5. Process of dewaxing petroleum oil which comprises diluting the oil with ethyl normal propyl ketone, chilling the diluted oil to a wax separation temperature, removing the wax by filtration, and recovering dewaxed oil.

6. Process for separating wax from waxy oils which comprises the steps of filtering a chilled mixture of oil, solid wax and a solvent consisting essentially of an aliphatic normal ketone containing a propyl group and selected from the class having 5 and 6 carbon atoms in the molecule, washing the filtered cake with fresh solvent, adding the washings so obtained to the fresh mixture of oil and wax to be filtered, chilling the same to solidify the wax, forwarding it for filtration, and withdrawing the wax cake and the filtrate.

7. Process according to claim 6 in which the cycle of steps is carried out in a continuous manner.

8. Process according to claim 6 in which the mixture subjected to filtration contains from 1 to 2½ volumes of solvent per volume of hydrocarbon constituents.

9. Process for dewaxing petroleum oil which comprises diluting the oil with a mixture of a normal propyl ketone selected from the class having 5 and 6 carbon atoms in the molecule and methyl normal butyl ketone, chilling the mixture to a wax separation temperature, separating the wax by filtration, and recovering dewaxed oil.

10. Process according to claim 9 in which the solvent mixture contains approximately equal parts of methyl normal propyl ketone and methyl normal butyl ketone.

OLDRICH S. POKORNY.